United States Patent [19]
Hardy et al.

[11] 3,937,299
[45] Feb. 10, 1976

[54] BOLT HEAD SHROUD

[75] Inventors: Gerald D. Hardy, East Peoria;
Eugene A. Plouzek, Washington;
James G. Starling, Peoria, all of Ill.

[73] Assignee: Caterpillar Tractor Co., Peoria, Ill.

[22] Filed: Aug. 2, 1974

[21] Appl. No.: 494,310

[52] U.S. Cl. ............................ 184/1 R; 192/113 B
[51] Int. Cl.² ........................................ F16N 7/00
[58] Field of Search .......... 184/15 B, 15 A, 14, 1 R,
184/13, 63; 188/264 D, 264 B, 264 W, 264
R; 192/112, 113 R, 113 B; 74/467, 230, 606
A, 609; 123/196 CP; 308/95, 97, 109

[56] References Cited
UNITED STATES PATENTS 2,935,889  5/1960  Adams et al. ......................... 74/467
3,477,547  11/1969  Kress et al. .......................... 184/63

Primary Examiner—Richard C. Pinkham
Assistant Examiner—William R. Browne
Attorney, Agent, or Firm—Ralph E. Walters

[57] ABSTRACT

A drive assembly having a shroud structure for providing a low friction covering of securing elements which, in projecting from a rotation portion of the drive assembly, would otherwise cause a power and efficiency loss as the result of a friction drag produced in movement of the projecting elements through a body of lubricating and cooling fluid. The shroud structure is secured to the rotating element by securing structure received in recesses in the shroud to further effectively minimize friction drag losses.

23 Claims, 8 Drawing Figures

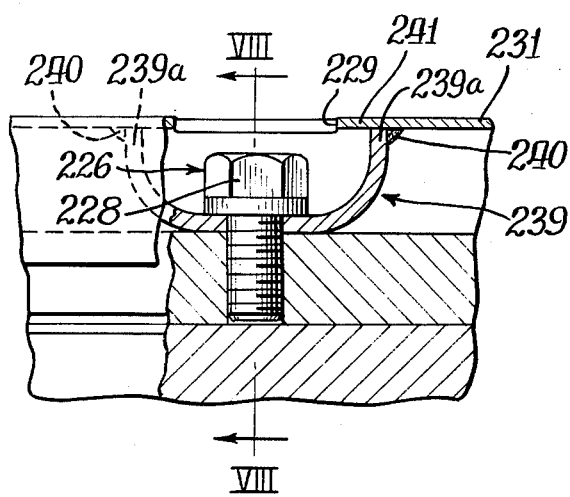
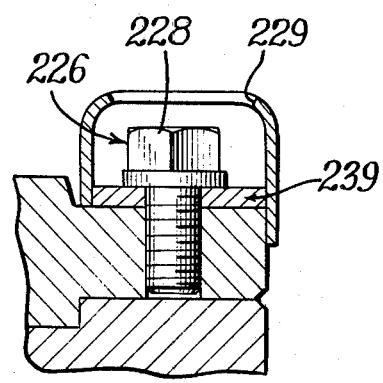

BOLT HEAD SHROUD

BACKGROUND OF THE INVENTION

1. Field of the Invention

This invention relates to drive assemblies and in particular to means for minimizing friction drag losses in the movement of rotary drive assemblies through a body of lubricating and cooling fluid.

2. Description of the Prior Art

In one form of drive assembly used in crawler-type vehicles, the power train utilizes beveled gears and a complementing pair of steering clutches and brakes for effecting the individual drive of endless traction belts or chains normally provided on opposite sides of the vehicle. Large forces are generated in the operation of the power trains as they are conventionally utilized to effect steering and the like by selectively disengaging the clutches to interrupt the flow of power selectively to the different belts or chains. Concurrently, selective braking of the nonpowered chain is effected. Conventionally, the clutches and brakes are of the friction type and it is necessary to provide constant lubrication and cooling thereof in the operation of the apparatus.

One conventional form of providing the lubrication and cooling fluid to the drive assembly, such as the clutch of the power train, is to dispose the clutch to move through a body of refrigerating and cooling fluid carried in a subjacent sump. A substantial portion of the clutch is caused to pass through the collected fluid to provide the desired lubricating and cooling function.

A problem arises in such structures in that the clutch assembly includes securing elements, such as cap screws, which are utilized to secure different portions thereof together and which, during the movement of the clutch through the lubricating and cooling fluid, cause a power loss as a result of the friction drag produced by the cap screws as they move through the fluid.

One attempted solution to this problem is illustrated in U.S. Pat. No. 3,477,547 of Ralph H. Kress et al., owned by the assignee hereof. Therein, friction between the moving members of the drive assembly and the lubricant fluid is reduced by reducing the amount of lubricant so that during high speed rotation, centrifugal forces retain the fluid lubricant about the periphery of the gear housing. Angled tubes are provided for collecting lubricant from the housing and directing it inwardly onto the gears. It has further been known to provide, in connection with such large diameter beveled gears, a shroud of shallow depth to which a small portion of the oil returns in the operation of the gears. The gears are isolated from the main volume of coolant oil in the final drive case, and the main supply tends to remain separated from the rapidly rotating teeth of the gear.

While minimizing the amount of lubricant contacted by a moving drive assembly is efficacious in minimizing drag, it limits cooling of the drive assembly as when the drive assembly is utilized as discussed above in such high force applications as braking and de-clutching of tractor chain power drives.

SUMMARY OF THE INVENTION

The present invention comprehends a drive assembly having new and improved means for providing a low friction rotary movement thereof through a body of heat transfer lubricant fluid.

The rotating means, in the illustrated embodiment, comprises a rotary clutch assembly having outwardly projecting securing elements. The means providing the low friction movement of the clutch assembly comprises shroud means secured to the clutch assembly for rotation therewith and covering the securing elements.

In the illustrated embodiment, the securing elements comprise cap screws disposed in an annular array coaxially of the axis of rotation of the clutch assembly and the shroud means comprises an annular shroud overlying the cap screw array.

The shroud may comprise a U-section annular wall straddling the cap screws. In the illustrated embodiment, the shroud is formed of a pair of semiannular elements disposed end to end to define a substantially continuous annular configuration.

In the illustrated embodiment, the shroud is secured to the clutch assembly by screws with the heads of the screws being recessed within the shroud. More specifically, the shroud is provided with at least one recessed portion defining an outwardly opening recess. The securing elements may comprise screws having threaded shank portions extending through the recessed portion and threaded to the clutch assembly. The head of the screw is received in the recess.

The recessed portion of the shroud may comprise a cup-shaped element secured to the shroud across an opening in the shroud. In the illustrated embodiment, the cup-shaped element is welded to the shroud about the periphery of the opening, and in one form, the cup-shaped element is secured circumjacent the opening whereby the shroud portion defining the opening peripherally overhangs the recess.

In one form, the U-section shroud includes legs of dissimilar length.

The securing screws may be connected to the shroud by extension thereof through a spacer secured to the shroud with the head of the screw disposed outwardly of the space in the recess. The spacer may comprise a rigid block effectively preventing distortion of the shroud by the tightening of the securing element in securing the shroud to the clutch assembly.

Thus, the drive assembly drag minimizing means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 7 is a fragmentary section similar to that of FIG. 3 but illustrating a further modified form of shroud securing means; and FIG. 8 is a fragmentary cross section taken substantially along the line VIII—VIII of FIG. 7.

DESCRIPTION OF THE PREFERRED EMBODIMENTS

Figure 1:
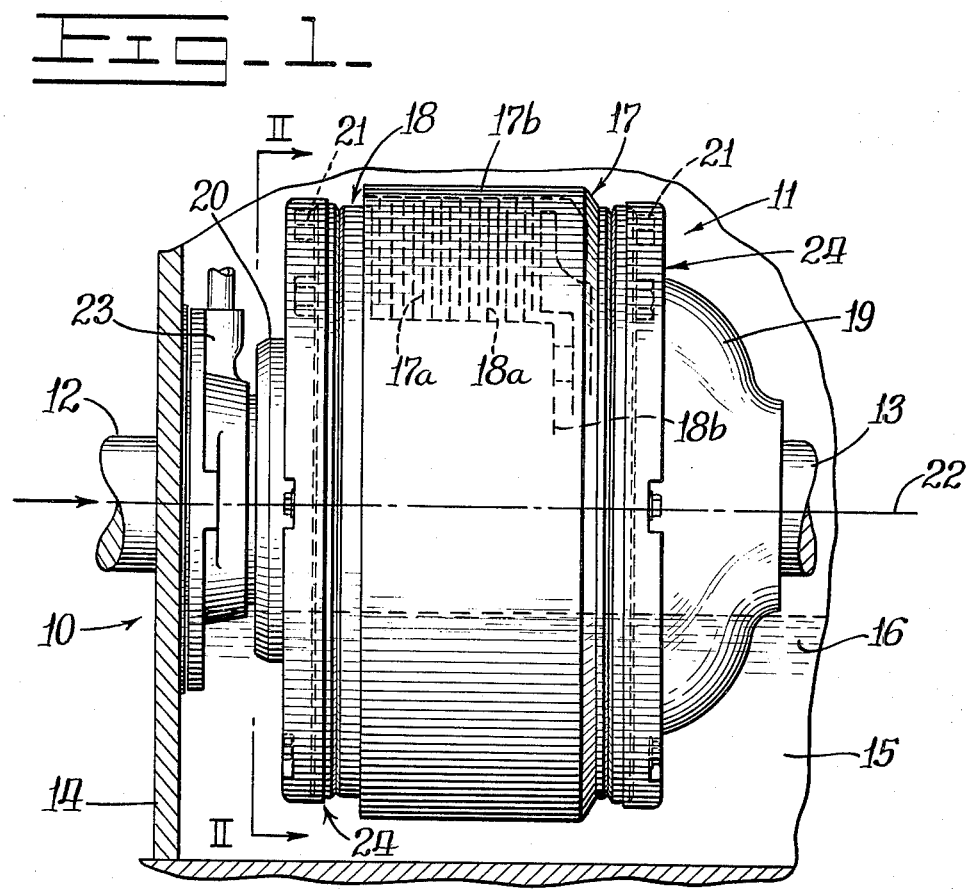
FIG. 1 is a fragmentary side elevation of a clutch assembly having an improved drag minimizing means embodying the invention.

In the exemplary embodiment of the invention as disclosed in FIGS. 1-4 of the drawing, a power train portion generally designated 10 is shown to comprise a clutch assembly generally designated 11 for transferring power between an input shaft 12 and an output shaft 13. The clutch assembly is mounted for rotation within a wall structure 14 defining a sump cavity 15 in which a body of heat transfer lubricant 16 is provided. As shown in FIG. 1, the clutch is disposed so as to have a substantial portion thereof extend downwardly into the fluid 16 to provide desired lubrication and cooling of the clutch in the use thereof.

The clutch may comprise a pair of clutch halves 17 and 18 provided with interleaved coacting friction drive discs 17a and 18a, respectively. The drive discs are carried by splined drums 17b and 18b which, in turn, are secured to the shafts 13 and 12, respectively, by mounting flanges 19 and 20. The clutch drums are secured to the mounting flanges herein by a plurality of securing elements illustratively comprising cap screws 21 disposed in an annular array coaxially about the axis of rotation 22 of the clutch assembly.

Engagement of the clutch drive discs 17a and 18a is effected by a conventional hydraulic operator 23. Thus, when the clutch is engaged, the cap screws 21 of the clutch half 17 are carried thereby through the fluid 16 concurrently with the movement of the cap screws 21 on the clutch half 18. When the clutch is disengaged, the cap screws 21 on the clutch half 18 continue to move through the fluid 16 as long as the input shaft 12 is driven. Thus, a substantial frictional drag could be imposed on the drive by the projecting cap screws in moving through the fluid in the normal operation of the clutch. To prevent this undesirable frictional drag, improved cover structures generally designated 24 are provided.

Figure 2:
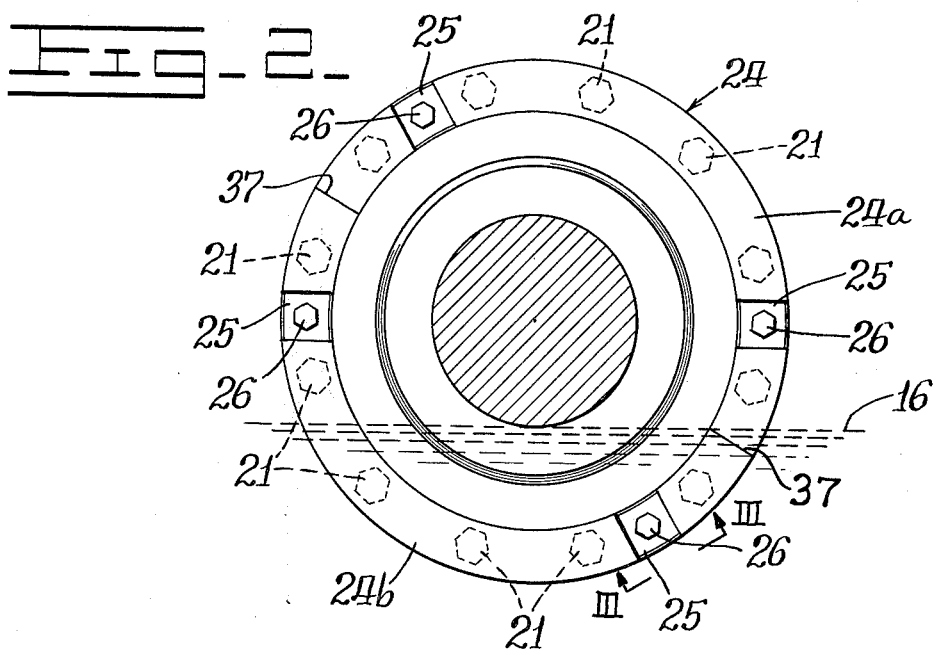
FIG. 2 is a vertical section thereof taken substantially along the line II—II of FIG. 1.

More specifically, as shown in FIGS. 1 and 2, each cover structure 24 comprises an annular shroud formed of a pair of semiannular shroud elements 24a and 24b disposed end to end to define a substantially continuously annular shroud configuration effectively covering the cap screws 21 and presenting a low friction, annular surface to the fluid 16. Each shroud element is provided with at least one recess portion 25 for receiving a securing element illustratively comprising a cap screw 26. As shown in FIG. 2, in the illustrated embodiment, two such recessed portions 25 may be provided in each semiannular shroud element adjacent the opposite ends thereof.

Figure 3:
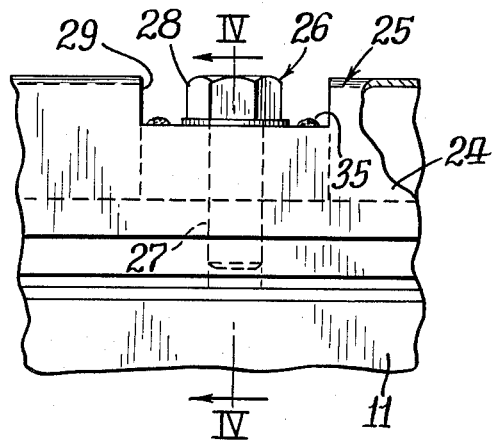
FIG. 3 is a fragmentary enlarged view taken substantially along the line III—III of FIG. 2.
Figure 4:
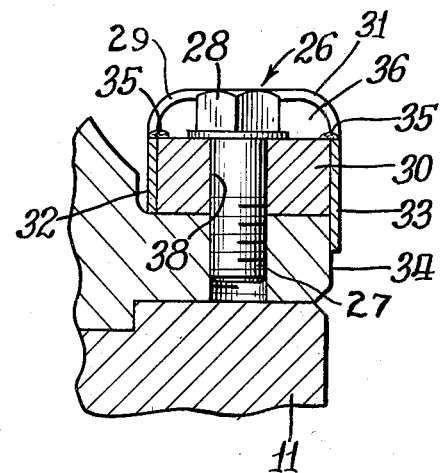
FIG. 4 is a fragmentary section taken substantially along the line IV—IV of FIG. 3.

Referring now to FIG. 3, the arrangement of the securing means is more specifically illustrated to comprise cap screws 26 each having a shank portion 27 and a head portion 28. The recess portion 25 of the shroud element may comprise an opening 29 in the outer portion thereof and a spacer 30. The shroud elements, as best seen in FIG. 4, effectively comprise U-section elements having an outer bight portion 31 and a pair of opposed legs 32 and 33. As shown in FIGS. 2 and 4, leg 33 may have a length greater than that of leg 32 so as to overlie the outer surface 34 of the clutch structure and thereby align the shroud in centered relationship with the annular array of cap screws 21. Spacer 30 may be secured to the legs 32 and 33 by suitable means, such as weld 35, and as shown in FIG. 4, has a height less than the height of the U-shaped shroud so as to permit bolt head 28 to be received within the space 36 defined by the shroud, thereby eliminating the projection of any securing elements outwardly beyond the shroud and permitting the shroud to provide a low friction, minimized drag structure in moving through the fluid 16, as shown in FIG. 1. Any fluid entering the shroud through the openings 29 tends to move with the shroud, thereby further minimizing drag.

The spacers 30 serve to prevent distortion of the shroud which, as shown, may be formed of relatively thin sheet metal, or like material, thereby effectively maintaining the abutment of the opposite ends 37 of the shroud halves 24a and 24b, as shown in FIG. 2. In the illustrated embodiment, spacer 30 comprises a metal block having a through bore 38 for passing the shank 27 of the securing screw 26, as best seen in FIG. 4.

Figure 5:
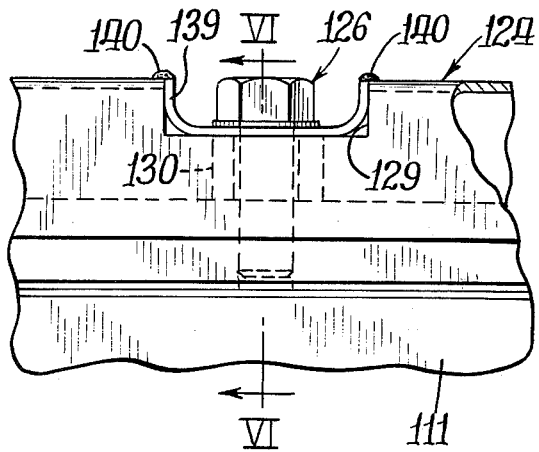
FIG. 5 is a fragmentary section similar to that of FIG. 3 but illustrating a modified form of shroud securing means.
Figure 6:
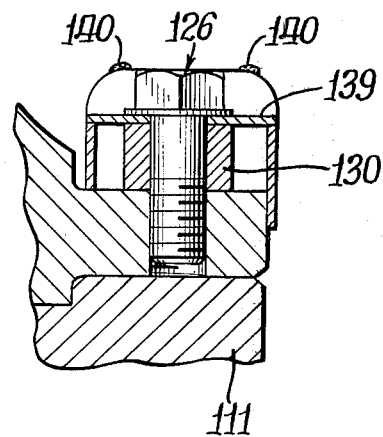
FIG. 6 is a fragmentary section taken substantially along the line VI—VI of FIG. 5.

A modified form of means for securing the shrouds to the clutch assembly 111 is illustrated in FIGS. 5 and 6. As shown therein, the shroud cover structure 124 is provided with openings 129 similar to openings 29 of the embodiment of FIGS. 1-4. Securing means in the form of cap screws 126 similar to cap screws 26 are provided for securing the shroud structure 124 to the clutch 111. However, in lieu of the spacer 30 of the first embodiment, an annular spacer 130 is provided for supporting a cup-shaped plate 139 which extends across the opening 129 and which is secured at its opposite ends to the shroud by suitable means, such as welds 140. Thus, the cup-shaped elements define relatively shallow recesses in the shroud minimizing the amount of fluid which may be trapped therein and caused to move with the shroud in the rotation of the clutch assembly. As in the first embodiment, the spacer 130 serves to prevent distortion of the shroud by the tightening of the screws 126 for facilitated installation of the friction reducing means.

Turning now to the embodiment of FIGS. 7 and 8, a further modified form of means for securing the shrouds to the clutch assembly is illustrated. As shown in FIGS. 7 and 8, the openings 229 may be reduced in size to comprise circular openings having a diameter slightly larger than the cross section of the bolt head 228 to provide access to the bolt while minimizing the opening of the shroud to the fluid 16. A cup-shaped plate 239 may be provided generally similar to cup-shaped plate 139, but of slightly longer extent so as to have the end portions 239a underlining the shroud portion 241 defining the periphery of opening 229. The plate ends 239a may be secured to the underside of the shroud bight portion 231 by suitable means, such as welds 240. Thus, cup-shaped plate 239 functions similarly to cup-shaped plate 139 in providing a relatively small recess for receiving fluid 16 in the operation of the apparatus. Further, the relatively small opening 229 provides a relatively smooth shearing action between fluid in the recess and the main body of fluid 16 in the sump 15.

In the embodiments of FIGS. 5 and 6 and 7 and 8, elements similar to those of the embodiment of FIGS. 1-4 are identified by similar reference numerals, except 100 or 200 higher, respectively. Except as otherwise indicated, the embodiments of FIGS. 5 and 6 and FIGS. 7 and 8 function similarly to the embodiment of FIGS. 1-4.

Thus, the present invention provides an improved drive means wherein a rotating element, such as in a clutch assembly, having outwardly projecting securing elements may be passed through a body of lubricating and cooling fluid with minimum friction drag while yet permitting a substantial insertion of the rotating body into the fluid for effecting maximum lubricating and cooling action. By effectively minimizing the friction drag, the power requirements of the drive are reduced. The arrangement of the present invention permits facilitated mounting of the drag reducing means by means of recessed securing elements. The shroud structure is extremely simple and economical of construction while yet providing the improved friction reducing function as discussed above.

The foregoing disclosure of specific embodiments is illustrative of the broad inventive concepts comprehended by the invention.

We claim:

1. In a drive assembly having means defining a cavity, heat transfer lubricant fluid in a lower portion of the cavity, and a rotating clutch assembly in the cavity supported for rotation to have a substantial portion thereof extending downwardly into said fluid for lubrication and cooling of the clutch assembly by said fluid, said clutch assembly including outwardly projecting securing means for securing clutch drums to mounting flanges, means for effectively minimizing frictional drag of said securing means in moving through the fluid, said means for effectively minimizing fluid frictional drag comprising shroud means covering said securing means and rotatable therewith and providing a low fluid friction drag covering for said securing means.

2. The drive assembly of claim 1 wherein said securing means comprise cap screws.

3. The drive assembly of claim 1 wherein said securing means are disposed in an annular array about the axis of rotation of the clutch assembly and said shroud means defines an annular radially outer wall extending coaxially of said axis.

4. The drive assembly of claim 1 wherein said securing means are disposed in an annular array about the axis of rotation of the clutch assembly and said shroud means defines a U-section annular wall extending coaxially of said axis.

5. The drive assembly of claim 1 wherein said securing means are disposed in an annular array about the axis of rotation of the clutch assembly and said shroud means includes a pair of semiannular U-section elements disposed in an end-to-end annular configuration forming a substantially continuous annular wall extending coaxially of said axis.

6. The drive assembly of claim 1 wherein said shroud means defines a plurality of recessed portions each defining an outwardly opening recess, and a corresponding plurality of screws being associated one each with said recessed portions for securing the shroud means to the clutch assembly, each said screw including a shank portion extending through its associated recessed portion of the shroud means and threadedly secured to the clutch assembly, and a head portion received substantially fully in the associated recess.

7. In a drive assembly having means defining a cavity for housing heat transferring lubricant fluid in a lower portion a rotating clutch assembly in the cavity supported for rotation about its axis and having a substantial portion thereof extending downwardly into fluid which serves as a lubricating and cooling medium for the clutch assembly, said clutch assembly including a plurality of outwardly projecting securing means for securing clutch drums to mounting flanges, said securing means being arranged in an annular array about the axis of rotation of the clutch assembly, means for effectively minimizing fluid frictional drag of said securing means during rotational movement thereof through a lubricant, said last mentioned means comprising an annular shroud coaxially secured to the clutch assembly for rotation therewith and covering said securing means.

8. The drive assembly of claim 7 wherein said shroud has a U-shaped cross section.

9. The drive assembly of claim 7 wherein said shroud comprises a pair of semiannular elements disposed end-to-end to define a substantially continuous 360° annular shroud configuration.

10. In a drive assembly having means defining a cavity for housing heat transferring lubricant fluid in a lower portion thereof, a rotating clutch assembly in the cavity supported for rotation, and having a substantial portion thereof extending downwardly into fluid which serves as a lubricating and cooling medium for the clutch assembly, said clutch assembly including a plurality of outwardly projecting securing means for securing clutch drums to mounting flanges arranged in an annular array about the axis of rotation of the clutch assembly, means for effectively minimizing fluid frictional drag of said securing means during rotational movement thereof through a lubricant, said last mentioned means comprising an annular shroud coaxially secured to the clutch assembly for rotation therewith and covering said securing means, said shroud having a recessed portion defining an outwardly opening recess, and a screw being associated with said recessed portion for securing the shroud to the clutch assembly, said screw including a shank portion extending through the recessed portion of the shroud and threadedly secured to the clutch assembly, and a head portion received substantially fully in said recess.

11. The drive assembly of claim 10 further including a spacer disposed between said clutch assembly and said head portion of the screw to effectively preclude distortion of the shroud as by excessive tightening of the screw.

12. The drive assembly of claim 10 wherein said recessed portion being defined by an opening in the shroud and a cup-shaped element secured to the shroud in the opening.

13. The drive assembly of claim 10 wherein said recessed portion is defined by an opening in the shroud and a cup-shaped element is welded to the shroud in the opening.

14. The drive assembly of claim 10 further including a spacer disposed between said clutch assembly and said head portion of the screw to effectively preclude distortion of the shroud as by excessive tightening of the screw, said spacer comprising a body of rigid material having a through bore, said screw shank portion extending through said bore.

15. The drive assembly of claim 10 wherein said recessed portion is defined by an opening in the shroud, and a spacer is secured to the shroud in the opening and defining a bore through which said screw shank portion extends.

16. The drive assembly of claim 10 wherein said recessed portion is defined by an opening in the shroud, and a cup-shaped element is recessed in the opening and is provided with a peripheral portion secured to said shroud along the periphery of said opening.

17. The drive assembly of claim 10 wherein said recessed portion is defined by an opening in the shroud, and a cup-shaped element is recessed in the opening and is provided with a peripheral portion secured to a shroud portion circumjacent the periphery of said opening whereby said shroud portion peripherally overhangs said recess.

18. The drive assembly of claim 10 wherein said recessed portion is defined by an opening in the shroud, and a cup-shaped element is recessed in the opening and is provided with a peripheral portion secured to a shroud portion circumjacent the periphery of said opening whereby said shroud portion peripherally overhangs said recess, said screw head portion being spaced substantially inwardly of said opening in said recess.

19. In a drive assembly having means defining a cavity, heat transfer lubricant fluid in a lower portion of the cavity, and a rotating clutch assembly in the cavity supported for rotation to have a substantial portion thereof extending downwardly into said fluid for lubrication and cooling of the clutch assembly by said fluid, said clutch assembly including outwardly projecting securing means for securing clutch drums to mounting flanges, measn for effectively minimizing frictional drag of said securing means in moving through the fluid, said means for effectively minimizing fluid frictional drag comprising a U-section shroud covering said securing means, said securing means securing the shroud to the clutch assembly for rotation therewith and being recessed within the shroud.

20. The drive assembly of claim 19 wherein the U-section shroud defines spaced side wall leg portions, one side wall leg portion having a length greater than that of the other side wall leg portion.

21. The drive assembly of claim 19 wherein the U-section shroud defines spaced side wall leg portions and a wall member is secured between said side wall leg portions and is provided with a through bore, said securing means comprising threaded means extending through said bore and threaded to said clutch assembly.

22. The drive assembly of claim 19 wherein the U-section shroud defines spaced side wall leg portions and a cup-shaped wall member is secured between said side wall leg portions and is provided with a through bore, said securing means comprising threaded means extending through said bore and threaded to said clutch assembly.

23. The drive assembly of claim 19 wherein the U-section shroud defines spaced side wall leg portions and a spacer is secured between said side wall leg portions and is provided with a through bore, said securing means comprising threaded means extending through said bore and threaded to said clutch assembly.

* * * * *